United States Patent
Koo et al.

(10) Patent No.: US 10,998,561 B1
(45) Date of Patent: May 4, 2021

(54) HYDROGEN FILLING SYSTEM

(71) Applicants: HYUNDAI MOTOR COMPANY, Seoul (KR); KIA MOTORS CORPORATION, Seoul (KR)

(72) Inventors: Jin Woo Koo, Seoul (KR); Myung Ju Jung, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/930,419

(22) Filed: May 12, 2020

(30) Foreign Application Priority Data

Oct. 23, 2019 (KR) .................. 10-2019-0132416

(51) Int. Cl.
| | | |
|---|---|---|
| *H01M 8/04* | (2016.01) | |
| *H01M 8/04007* | (2016.01) | |
| *H01M 8/04746* | (2016.01) | |
| *H01M 8/04082* | (2016.01) | |
| *H01M 8/22* | (2006.01) | |

(52) U.S. Cl.
CPC ... *H01M 8/04074* (2013.01); *H01M 8/04201* (2013.01); *H01M 8/04753* (2013.01); *H01M 8/222* (2013.01)

(58) Field of Classification Search
CPC ......... H01M 8/04074; H01M 8/04201; H01M 8/04753; H01M 8/222
USPC .................................. 429/334–340
See application file for complete search history.

(56) References Cited

U.S. PATENT DOCUMENTS

| | | | | |
|---|---|---|---|---|
| 5,301,723 | A * | 4/1994 | Goode | F17C 5/02 141/11 |
| 5,765,602 | A * | 6/1998 | Sutton | F17C 5/007 141/207 |
| 7,082,969 | B1 * | 8/2006 | Hollerback | B67D 7/04 141/38 |
| 8,408,254 | B2 * | 4/2013 | Shibukawa | F17C 7/00 141/82 |
| 8,776,843 | B2 * | 7/2014 | Komiya | F17C 3/08 141/93 |
| 9,595,725 | B2 * | 3/2017 | Mathie | H01M 8/04708 |
| 9,604,535 | B2 * | 3/2017 | Yahashi | B60K 15/077 |
| 2015/0079489 | A1 * | 3/2015 | Noh | H01M 8/04126 429/434 |
| 2018/0266633 | A1 * | 9/2018 | Fujita | H01M 8/04201 |

* cited by examiner

*Primary Examiner* — Timothy L Maust
(74) *Attorney, Agent, or Firm* — McDonnell Boehnen Hulbert & Berghoff LLP

(57) ABSTRACT

The present disclosure relates to a hydrogen filling system that includes a receptacle that is provided in a fuel cell electric vehicle and to which a fueling nozzle that dispenses hydrogen is connected, a manifold connected with a hydrogen tank provided in the fuel cell electric vehicle, a hydrogen filling line that connects the receptacle and the manifold, a hydrogen supply line that connects a fuel cell stack provided in the fuel cell electric vehicle and the manifold, and a buffer line that is connected to the hydrogen supply line and that heats the receptacle using heat of compression by the hydrogen that is supplied into the hydrogen supply line during filling of the hydrogen tank with the hydrogen. The present disclosure may obtain advantageous effects of suppressing freezing of the receptacle and improving safety and reliability.

10 Claims, 6 Drawing Sheets

HYDROGEN FILLING SYSTEM

CROSS-REFERENCE TO RELATED APPLICATION

This application claims the benefit of priority to Korean Patent Application No. 10-2019-0132416, filed in the Korean Intellectual Property Office on Oct. 23, 2019, the entire contents of which are incorporated herein by reference.

TECHNICAL FIELD

The present disclosure relates to a hydrogen filling system, and more particularly, relates to a hydrogen filling system for suppressing freezing of a receptacle connected with a fueling nozzle and improving safety and reliability.

BACKGROUND

A fuel cell electric vehicle (FCEV) produces electrical energy by an electro-chemical reaction of oxygen and hydrogen in a fuel cell stack and uses the electrical energy as a power source.

The fuel cell electric vehicle can continue to produce electricity irrespective of the capacity of a fuel cell by using fuel and air supplied from the outside and has advantages of high efficiency and low emission of pollutants. Accordingly, the fuel cell electric vehicle has consistently been studied and developed.

The fuel cell electric vehicle is equipped with hydrogen tanks (e.g., three hydrogen tanks), and hydrogen is stored in the hydrogen tanks along a hydrogen filling line of a hydrogen storage system. The hydrogen stored in the hydrogen tanks is throttled to a predetermined pressure through a regulator along a hydrogen supply line and thereafter supplied into a fuel cell stack to produce electrical energy.

Furthermore, the fuel cell electric vehicle is equipped with a receptacle that is a type of connector connected with a fueling nozzle for dispensing hydrogen gas.

However, in the related art, a freezing phenomenon may occur in a connecting portion between the fueling nozzle and the receptacle (around the receptacle) due to a very low filling temperature (e.g., −33° C. to −40° C.) during fast filling of the hydrogen tanks with the hydrogen. Due to the freezing phenomenon, the fueling nozzle may fail to be separated from the receptacle at the right time after the hydrogen tanks are completely filled with the hydrogen.

Accordingly, in recent years, various studies for suppressing freezing of a receptacle during filling of hydrogen tanks with hydrogen have been conducted, but there remains a need for development thereof.

SUMMARY

The present disclosure has been made to solve the above-mentioned problems occurring in the industry while advantages achieved by the industry are maintained intact.

An aspect of the present disclosure provides a hydrogen filling system for suppressing freezing of a receptacle connected with a fueling nozzle and improving safety and reliability.

In particular, another aspect of the present disclosure provides a hydrogen filling system for suppressing freezing of a receptacle while a hydrogen tank is filled with hydrogen and easily separating a fueling nozzle from the receptacle after the hydrogen tank is completely filled with the hydrogen.

Furthermore, another aspect of the present disclosure provides a hydrogen filling system for minimizing deterioration in durability and safety due to freezing of a receptacle.

In addition, another aspect of the present disclosure provides a hydrogen filling system for suppressing overheating of a hydrogen tank at the right time and minimizing deterioration in durability of the hydrogen tank and damage to the hydrogen tank.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hydrogen filling system includes a receptacle that is provided in a fuel cell electric vehicle and to which a fueling nozzle that dispenses hydrogen is connected, a manifold connected with a hydrogen tank provided in the fuel cell electric vehicle, a hydrogen filling line that connects the receptacle and the manifold, a hydrogen supply line that connects a fuel cell stack provided in the fuel cell electric vehicle and the manifold, and a buffer line that is connected to the hydrogen supply line and that heats the receptacle using heat of compression by the hydrogen that is supplied into the hydrogen supply line during filling of the hydrogen tank with the hydrogen.

The aim is to suppress freezing of the receptacle connected with the fueling nozzle and improve safety and reliability.

That is, in the related art, a freezing phenomenon occurs in a connecting portion between a fueling nozzle and a receptacle (around the receptacle) due to a very low filling temperature (e.g., −33° C. to −40° C.) during fast filling of a hydrogen tank with hydrogen, and due to the freezing phenomenon, the fueling nozzle fails to be separated from the receptacle at the right time after the hydrogen tank is completely filled with the hydrogen.

However, the present disclosure heats the receptacle using the heat of compression that is generated in the buffer line, which is connected to the hydrogen supply line, during the filling of the hydrogen tank with hydrogen, thereby obtaining advantageous effects of suppressing freezing of the receptacle and improving safety and reliability.

This results from the fact that the heat of compression is generated in the hydrogen in the buffer line when the pressure in the buffer line is raised to a predetermined pressure or more by supplying the hydrogen into the buffer line, which is hermetically connected to the hydrogen supply line, during the filling of the hydrogen tank with the hydrogen.

Above all things, the present disclosure may suppress freezing of the receptacle without a separate heating means for heating the receptacle, thereby obtaining advantageous effects of simplifying the structure and easily separating the fueling nozzle from the receptacle after the hydrogen tank is completely filled with the hydrogen.

Preferably, a regulator that reduces the pressure of the hydrogen that is supplied into the fuel cell stack and a fuel processing system that adjusts the amount of the hydrogen that is supplied into the fuel cell stack may be provided on the hydrogen supply line.

More specifically, the regulator may be connected to the hydrogen supply line so as to be disposed between the manifold and the fuel cell stack, and the fuel processing system may be connected to the hydrogen supply line so as to be disposed between the regulator and the fuel cell stack.

The buffer line may be formed in various structures capable of being hermetically connected to the hydrogen supply line. Preferably, one end of the buffer line may be connected to the hydrogen supply line between the manifold and the regulator, and an opposite end of the buffer line may be connected to the receptacle.

More preferably, a sealed buffer chamber may be provided around the receptacle, and the opposite end of the buffer line may be connected to the buffer chamber.

More specifically, the receptacle may include a receptacle body having a supply fluid channel that is formed in the receptacle body and is in communication with the fueling nozzle, a valve member that selectively opens or closes the supply fluid channel, and a cover member that surrounds the receptacle body and has the buffer chamber formed therein.

For example, the buffer chamber may be formed to entirely surround an outer circumferential surface of the receptacle body. According to another embodiment of the present disclosure, the buffer chamber may be formed to helically surround an outer circumferential surface of the receptacle body.

According to an exemplary embodiment of the present disclosure, the hydrogen filling system may further include a temperature measuring unit that is provided in the buffer line and that measures the temperature of the hydrogen in the buffer line and a temperature display unit that is provided in the fuel cell electric vehicle and that displays the temperature of the hydrogen that is measured by the temperature measuring unit.

This results from the fact that the temperatures of the buffer line and the hydrogen tank are identically raised during the filling of the hydrogen tank with the hydrogen. The aim is to interrupt the supply of hydrogen before the hydrogen tank is overheated to a predetermined temperature or more (e.g., 85° C. or more), by indirectly detecting the temperature of the hydrogen tank through the temperature of the buffer line.

In general, hydrogen is dispensed at a very low temperature (e.g., −33° C. to −40° C.) in a hydrogen station. However, when the supply temperature of the hydrogen is raised depending on a situation of the hydrogen station (e.g., an abnormality in a cooler), the temperature of a hydrogen tank is excessively raised, and therefore the durability and safety of the hydrogen tank are deteriorated.

In the related art, whether the hydrogen tank is overheated or not is determined by mounting a temperature sensor in a fuel cell electric vehicle (e.g., the hydrogen tank) and remotely transmitting, to the hydrogen station, a signal (the temperature of the hydrogen tank) that is measured by the temperature sensor while the hydrogen tank is filled with hydrogen. However, when the temperature of the hydrogen tank is not accurately transmitted to the hydrogen station due to an abnormality in communication between the temperature sensor and the hydrogen station, it is difficult to determine at the right time whether the hydrogen tank is overheated.

However, the present disclosure may allow a user to directly determine whether the hydrogen tank is overheated or not, through the temperature display unit at the right time. Accordingly, even in the case of an abnormality in communication between the temperature sensor and the hydrogen station, the present disclosure may determine at the right time whether the hydrogen tank is overheated or not and may stop filling the hydrogen tank with the hydrogen before the hydrogen tank is overheated, thereby obtaining an advantageous effect of minimizing deterioration in the durability and safety of the hydrogen tank due to overheating.

Various measurement means capable of being mounted in the buffer line (e.g., in an end portion of the buffer line connected to the receptacle) to measure the inner temperature of the buffer line may be used as the temperature measuring unit. A bimetal temperature switch may preferably be used as the temperature measuring unit.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
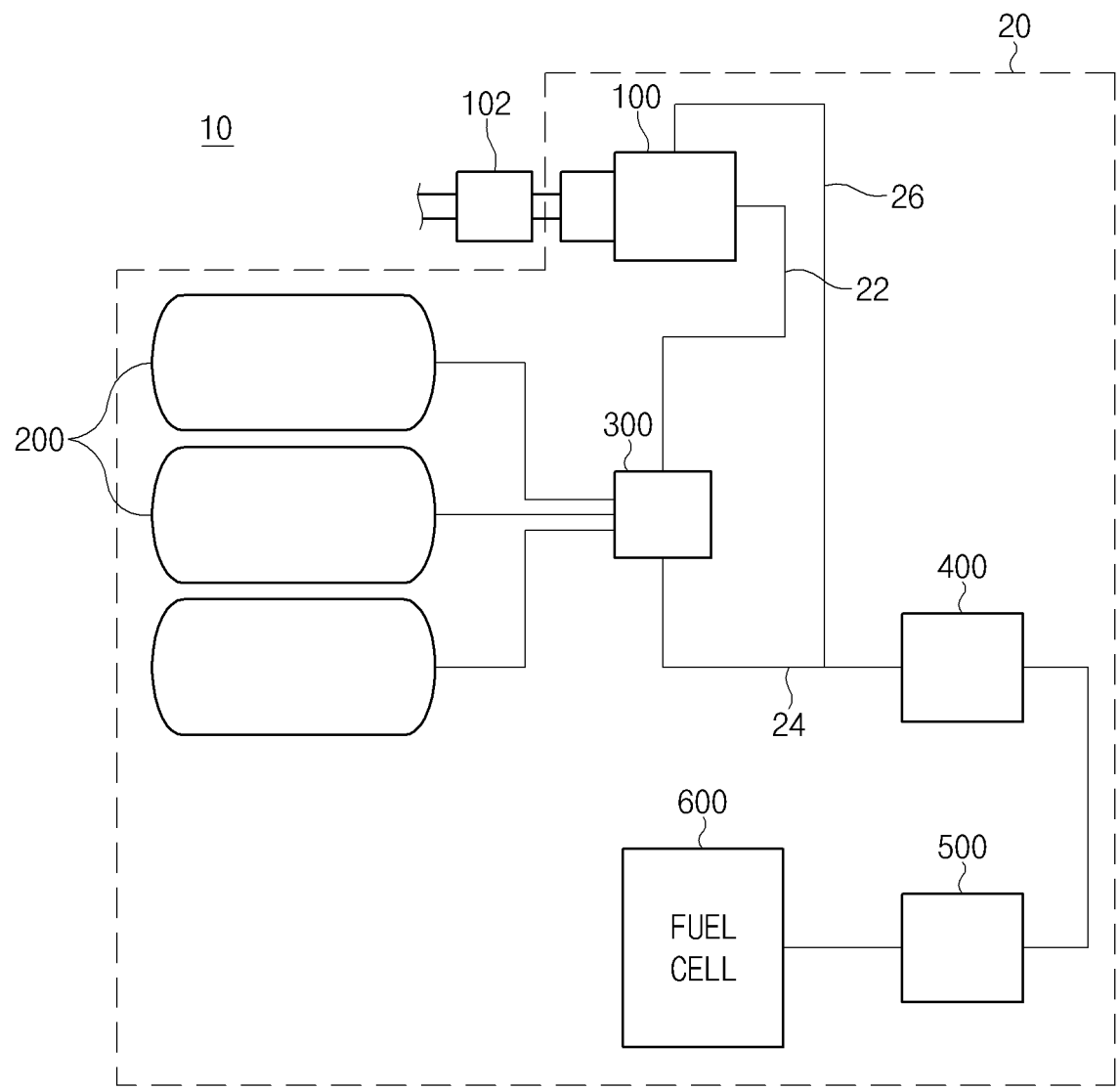
FIG. 1 is a view illustrating a hydrogen filling system according to the present disclosure.

Hereinafter, exemplary embodiments of the present disclosure will be described in detail with reference to the accompanying drawings. However, the present disclosure is not restricted or limited by the exemplary embodiments. For reference, the same reference numerals in this specification denote substantially the same components, components illustrated in different drawings may be described under the above rule, and descriptions that are well known to those skilled in the art or redundant will be omitted.

Figure 2:
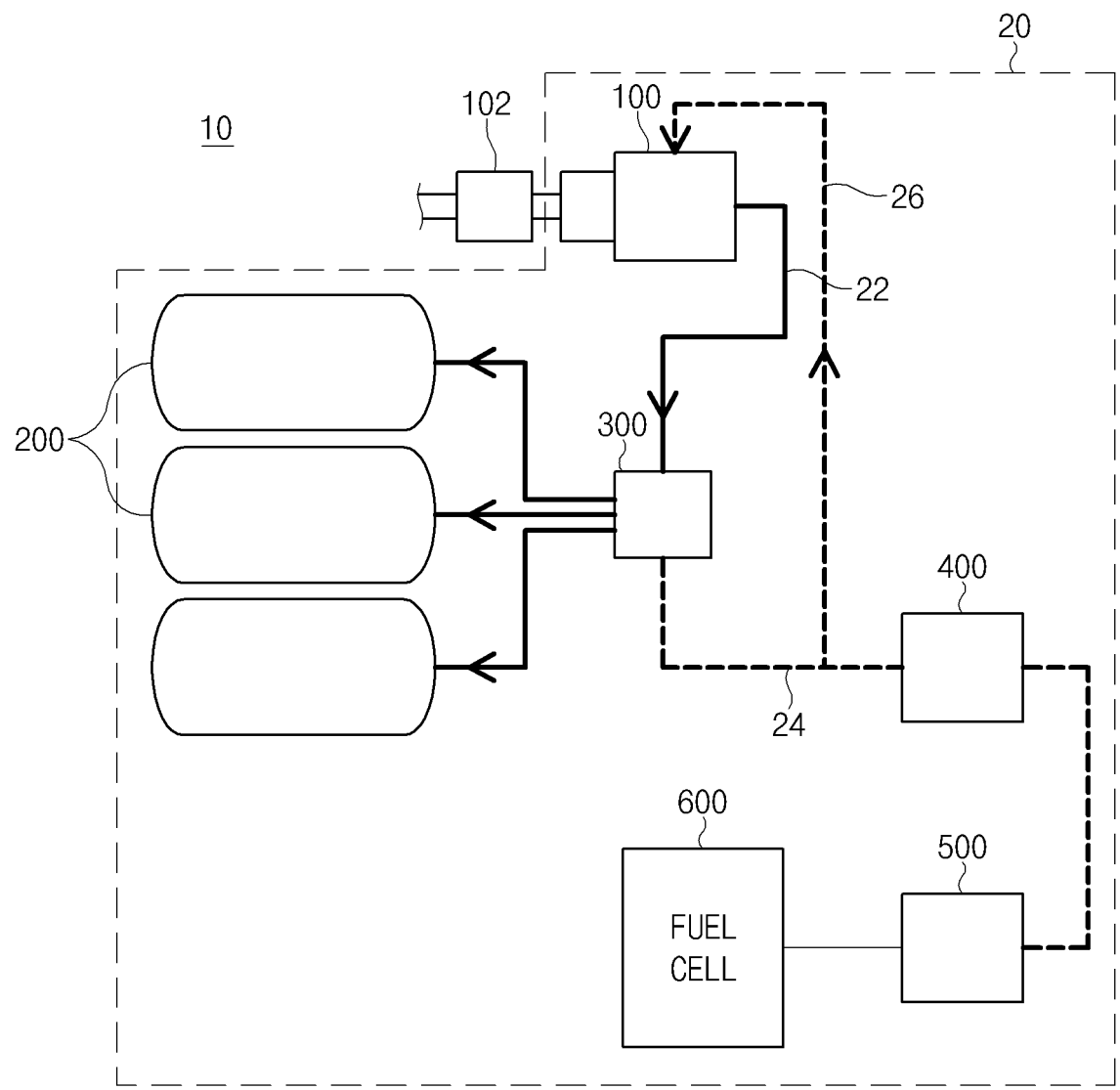
FIG. 2 is a view illustrating a flow of hydrogen during filling in the hydrogen filling system according to the present disclosure.
Figure 3:
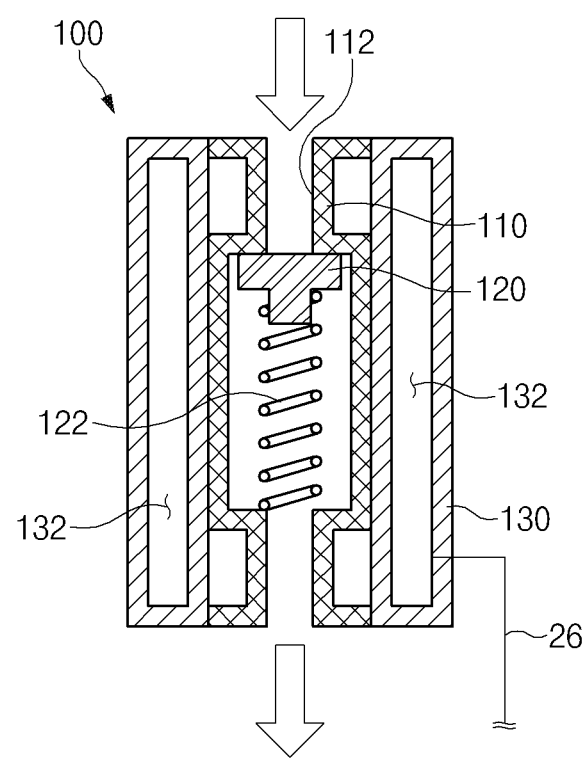
FIG. 3 is a view illustrating a buffer chamber of the hydrogen filling system according to the present disclosure.
Figure 4:
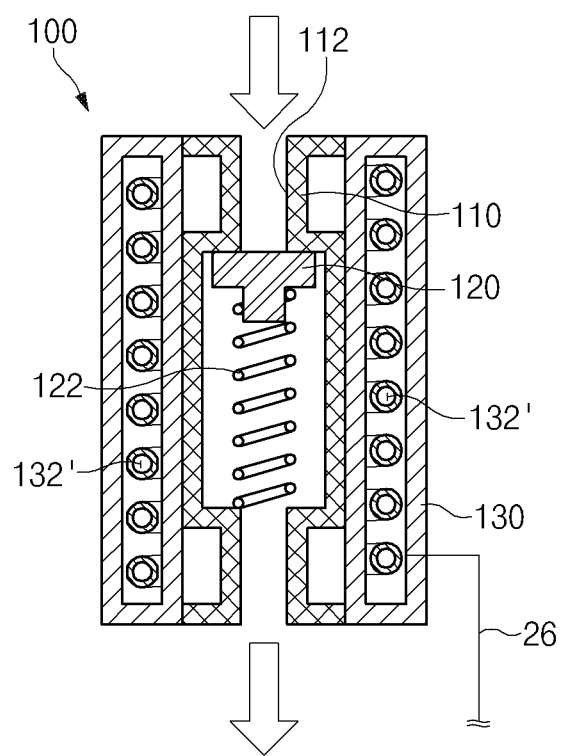
FIG. 4 is a view illustrating another embodiment of the buffer chamber of the hydrogen filling system according to the present disclosure.
Figure 5:
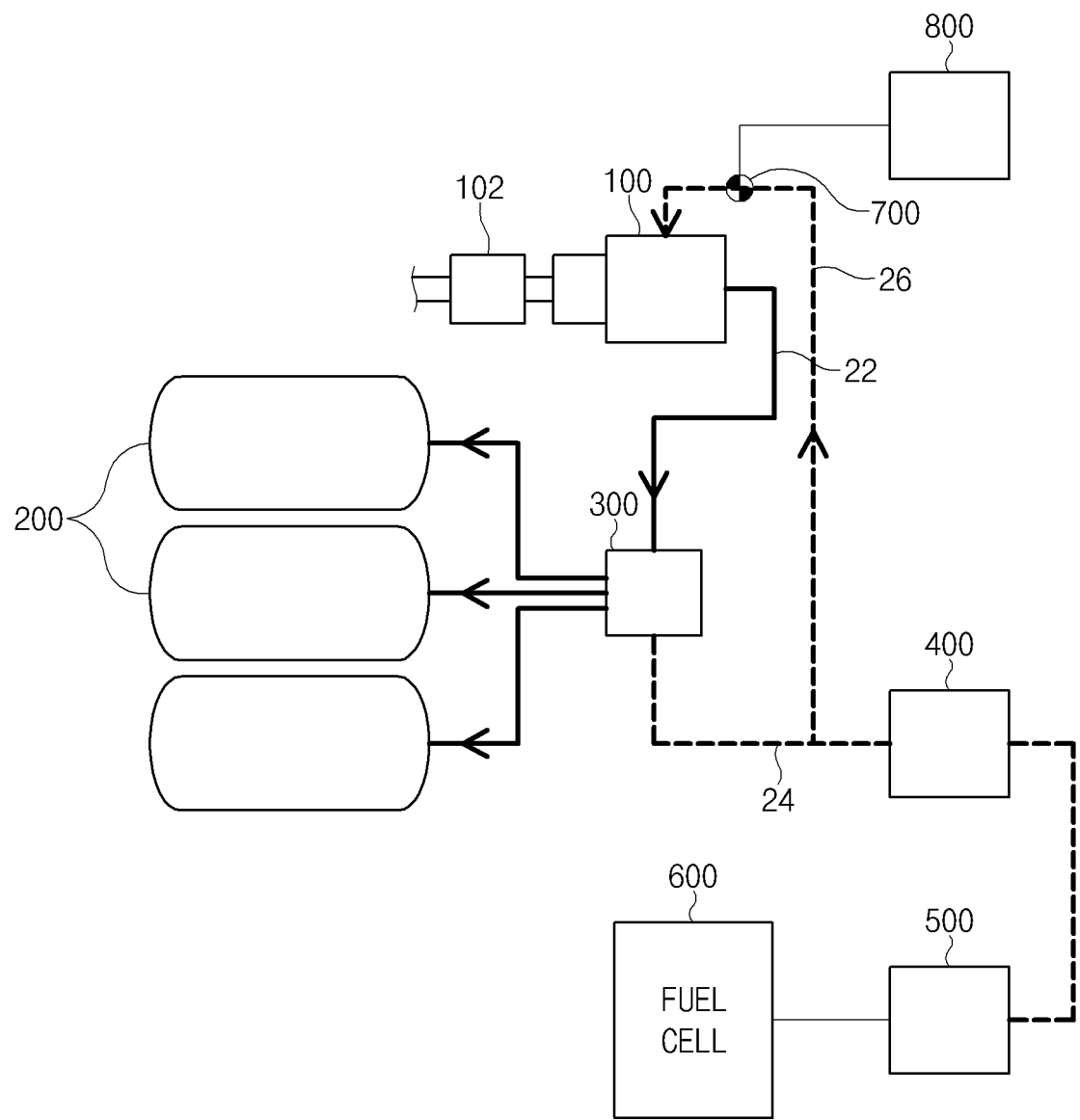
FIG. 5 is a view illustrating a temperature measuring unit and a temperature display unit of the hydrogen filling system according to the present disclosure.
Figure 6:
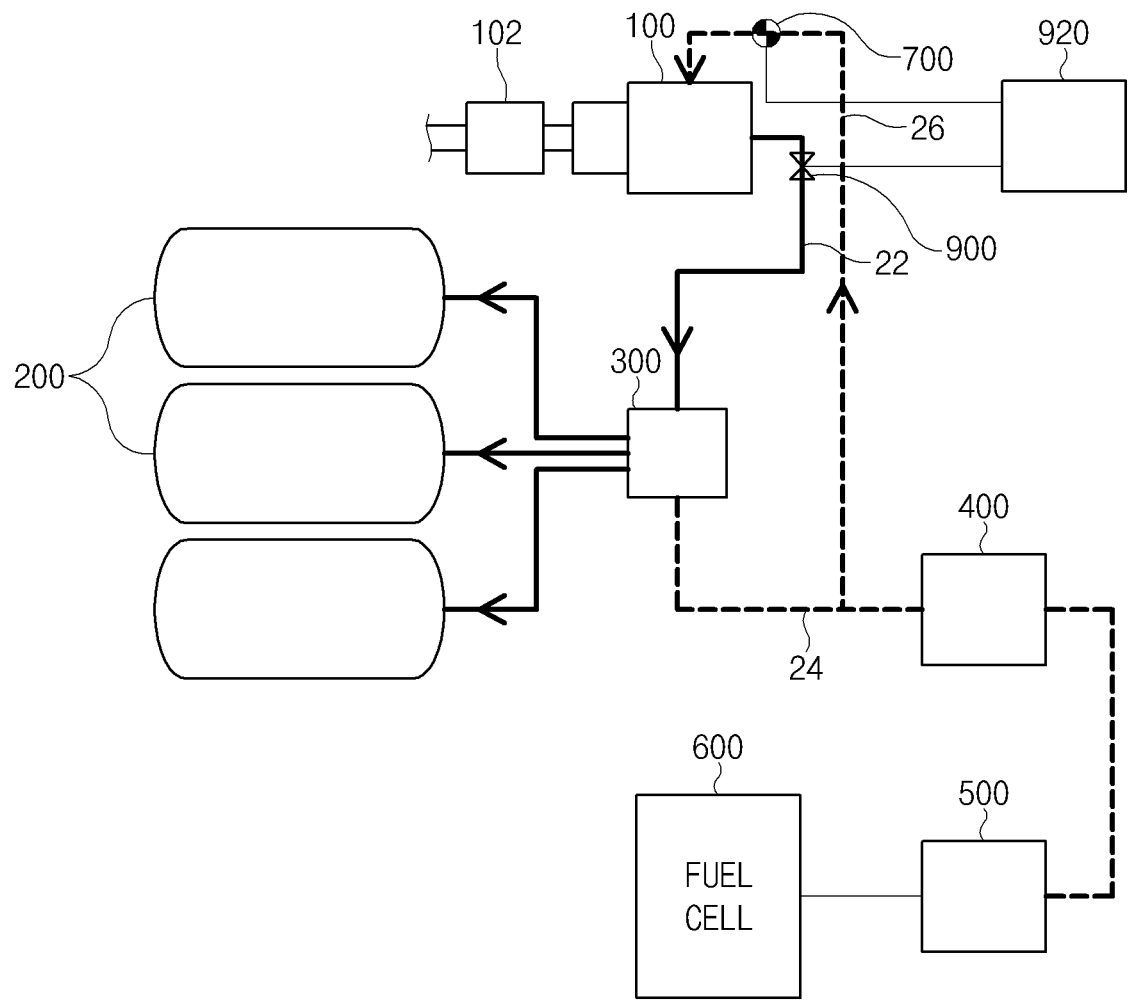
FIG. 6 is a view illustrating a control valve and a control unit of the hydrogen filling system according to the present disclosure.

FIG. 1 is a view illustrating a hydrogen filling system according to the present disclosure. FIG. 2 is a view illustrating a flow of hydrogen during filling in the hydrogen filling system according to the present disclosure. FIG. 3 is a view illustrating a buffer chamber of the hydrogen filling system according to the present disclosure. FIG. 4 is a view illustrating another embodiment of the buffer chamber of the hydrogen filling system according to the present disclosure. FIG. 5 is a view illustrating a temperature measuring unit and a temperature display unit of the hydrogen filling system according to the present disclosure. FIG. 6 is a view illustrating a control valve and a control unit of the hydrogen filling system according to the present disclosure.

Referring to FIGS. 1 to 6, the hydrogen filling system 10 according to the present disclosure includes a receptacle 100 that is provided in a fuel cell electric vehicle 20 and to which a fueling nozzle 102 for dispensing hydrogen is connected, a manifold 300 connected with hydrogen tanks 200 provided in the fuel cell electric vehicle 20, a hydrogen filling line 22 connecting the receptacle 100 and the manifold 300, a hydrogen supply line 24 connecting a fuel cell stack 600 provided in the fuel cell electric vehicle 20 and the manifold 300, and a buffer line 26 that is connected to the hydrogen supply line 24 and that heats the receptacle 100 using heat of compression by the hydrogen that is supplied into the hydrogen supply line 24 during filling of the hydrogen tanks 200 with the hydrogen.

The fuel cell electric vehicle 20 is equipped with the receptacle 100 to which the fueling nozzle 102 for dispensing the hydrogen is connected.

Various receptacles 100 capable of being connected (coupled) with the fueling nozzle 102 through a common coupling structure (e.g., a male and female coupling structure) may be used as the receptacle 100, and the present disclosure is not restricted or limited by the type and structure of the receptacle 100.

Furthermore, the fuel cell electric vehicle 20 is equipped with the hydrogen tanks 200 in which the hydrogen is stored, and the manifold 300 is connected to the hydrogen tanks 200.

For example, the fuel cell electric vehicle 20 may be equipped with three hydrogen tanks 200, and the manifold 300 may be commonly connected with the three hydrogen tanks 200. According to another embodiment of the present disclosure, the fuel cell electric vehicle 20 may be equipped with four or more, or two or less, hydrogen tanks, and the present disclosure is not restricted or limited by the number and arrangement of hydrogen tanks.

The manifold 300 may be formed in various structures capable of splitting a flow path of the hydrogen, and the present disclosure is not restricted or limited by the type and structure of the manifold 300. For example, the manifold 300 may include a first port (not illustrated) that is connected with the hydrogen supply line 24, second to fourth ports (not illustrated) that are connected with the three hydrogen tanks 200, and a fifth port (not illustrated) that is connected with the hydrogen filling line 22.

The hydrogen filling line 22 may be configured to connect the receptacle 100 and the manifold 300, and the hydrogen dispensed to the receptacle 100 through the fueling nozzle 102 is delivered to the hydrogen tanks 200 through the hydrogen filling line 22 and the manifold 300.

The hydrogen supply line 24 is configured to supply the hydrogen stored in the hydrogen tanks 200 into the fuel cell stack 600.

More specifically, the hydrogen supply line 24 is configured to connect the fuel cell stack 600 and the manifold 300 that are provided in the fuel cell electric vehicle 20, and the hydrogen stored in the hydrogen tanks 200 is supplied into the fuel cell stack 600 through the manifold 300 and the hydrogen supply line 24.

For reference, the fuel cell stack 600 may be formed in various structures capable of producing electricity through an oxidation-reduction reaction of fuel (e.g., hydrogen) and an oxidizing agent (e.g., air).

For example, the fuel cell stack 600 includes a membrane electrode assembly (MEA) (not illustrated) in which catalyst electrode layers where an electro-chemical reaction occurs are attached to both sides of an electrolyte membrane through which hydrogen ions move, a gas diffusion layer (GDL) (not illustrated) that serves to uniformly distribute reactant gases and deliver electrical energy generated, a gasket and a fastening mechanism (not illustrated) for maintaining air-tightness of the reactant gases and cooling water and appropriate fastening pressure, and a bipolar plate (not illustrated) that moves the reactant gases and the cooling water.

More specifically, in the fuel cell stack 600, hydrogen that is a fuel and air (oxygen) that is an oxidizing agent are supplied to the anode and the cathode of the membrane electrode assembly through fluid channels of the bipolar plate, respectively. The hydrogen is supplied to the anode, and the air is supplied to the cathode.

The hydrogen supplied to the anode is decomposed into a hydrogen ion (proton) and an electron by the catalysts of the electrode layers formed on the both sides of the electrolyte membrane. Only the hydrogen ion is selectively delivered to the cathode through the electrolyte membrane that is a cation exchange membrane, and simultaneously, the electron is delivered to the cathode through the gas diffusion layer and the bipolar plate that are conductors.

In the cathode, the hydrogen ion supplied through the electrolyte membrane and the electron delivered through the bipolar plate reacts with oxygen of the air supplied to the cathode by an air supply device to produce water. An electron flow is generated through an external conductor due to the movement of the hydrogen ion, and electric current is produced by the electron flow.

Furthermore, a regulator 400 and a fuel processing system (FPS) 500 are provided on the hydrogen supply line 24. The regulator 400 lowers the pressure of the hydrogen that is supplied into the fuel cell stack 600, and the fuel processing system 500 adjusts the amount of hydrogen that is supplied into the fuel cell stack 600.

More specifically, the regulator 400 may be connected to the hydrogen supply line 24 so as to be disposed between the manifold 300 and the fuel cell stack 600, and the hydrogen at high pressure (e.g., 700 bar) that is supplied along the hydrogen supply line 24 may be throttled down to low pressure (e.g., 16 bar) while passing through the regulator 400 and may be supplied into the fuel cell stack 600 in the pressure reduced state.

The fuel processing system 500 is connected to the hydrogen supply line 24 so as to be disposed between the regulator 400 and the fuel cell stack 600 and adjusts the amount of hydrogen that is supplied into the fuel cell stack 600. Furthermore, the supply of the hydrogen into the fuel cell stack 600 may be selectively allowed or interrupted by the fuel processing system 500.

The buffer line 26 is connected to the hydrogen supply line 24 and is configured to heat the receptacle 100 using heat of compression by the hydrogen that is supplied into the hydrogen supply line 24 during the filling of the hydrogen tanks 200 with the hydrogen.

More specifically, the buffer line 26 is configured to prevent a freezing phenomenon from occurring in a connecting portion between the fueling nozzle 102 and the receptacle 100 (around the receptacle 100) due to a very low filling temperature (e.g., −33° C. to −40° C.) during fast filling of the hydrogen tanks 200 with the hydrogen.

This results from the fact that the heat of compression is generated in the hydrogen in the buffer line 26 when the pressure in the buffer line 26 is raised to a predetermined pressure or more by supplying the hydrogen into the buffer line 26, which is hermetically connected to the hydrogen supply line 24, during the filling of the hydrogen tanks 200 with the hydrogen.

For example, the temperature (the hydrogen temperature) in the buffer line 26 (or the hydrogen tanks 200) is raised to about 70° C. when the pressure in the buffer line 26 is raised to about 700 bar by supplying the hydrogen into the buffer line 26 (or the hydrogen tanks 200). Accordingly, the receptacle 100 may be heated by using the heat of compression that is generated in the buffer line 26, which is hermetically connected to the hydrogen supply line 24, during the filling of the hydrogen tanks 200 with the hydrogen.

For reference, in the present disclosure, when the buffer line 26 is hermetically connected to the hydrogen supply line 24, this means that the buffer line 26 is connected to the hydrogen supply line 24 to form a sealed receiving space (a structure with a blocked outlet), like the hydrogen tanks 200 connected to the hydrogen filling line 22.

More specifically, referring to FIG. 2, during the filling of the hydrogen tanks 200 with the hydrogen (the hydrogen supply line 24 is blocked by the fuel processing system 500 during the filling of the hydrogen tanks 200 with the hydrogen), part of the hydrogen dispensed from the fueling nozzle 102 to the receptacle 100 flows through the manifold 300 and fills the hydrogen tanks 200, and the rest of the hydrogen dispensed from the fueling nozzle 102 to the receptacle 100 is supplied into the hydrogen supply line 24 through the manifold 300.

In addition, because the hydrogen supply line 24 is blocked by the fuel processing system 500 during the filling of the hydrogen tanks 200 with the hydrogen, the hydrogen supplied into the hydrogen supply line 24 flows through the buffer line 26. The buffer line 26 is formed in a sealed structure with a blocked outlet, and therefore the pressure and temperature in the buffer line 26 are increased by the hydrogen supplied into the buffer line 26 at the same time that the pressures and temperatures in the hydrogen tanks 200 are raised by the hydrogen supplied into the hydrogen tanks 200.

The buffer line 26 may be formed in various structures capable of being hermetically connected to the hydrogen supply line 24.

Preferably, one end (e.g., a first end portion) of the buffer line 26 is connected to the hydrogen supply line 24 between the manifold 300 and the regulator 400, and an opposite end (e.g., a second end portion) of the buffer line 26 is connected to the receptacle 100.

According to another embodiment of the present disclosure, one end of a buffer line may be connected to the hydrogen supply line 24 between the regulator 400 and the fuel processing system 500, and an opposite end of the buffer line may be connected to the receptacle 100.

More preferably, the sealed buffer chamber 132 is provided around the receptacle 100, and the opposite end of the buffer line 26 is connected to the buffer chamber 132.

More specifically, the receptacle 100 may include a receptacle body 110 having a supply fluid channel 112 formed therein which is in communication with the fueling nozzle 102, a valve member 120 that selectively opens or closes the supply fluid channel 112, and a cover member 130 that surrounds the periphery of the receptacle body 110, and the buffer chamber 132 may be formed in the cover member 130.

For reference, the valve member 120 may be configured to elastically open or close the supply fluid channel 112 by using a spring member 122, and the structure of the valve member 120 and the opening/closing structure may be variously modified depending on a required condition and a design specification.

For example, referring to FIG. 3, the buffer chamber 132 may be formed in a cylindrical shape that entirely surrounds the outer circumferential surface of the receptacle body 110.

According to another embodiment of the present disclosure, referring to FIG. 4, the buffer chamber 132' may be formed to partially surround the outer circumferential surface of the receptacle body 110 in a helical shape.

As described above, during the filling of the hydrogen tanks 200 with the hydrogen, the receptacle 100 may be heated by the heat of compression that is generated in the buffer chamber 132 formed around the receptacle 100, which results in an advantageous effect of suppressing the freezing phenomenon that occurs in the connecting portion between the fueling nozzle 102 and the receptacle 100 (around the receptacle 100) due to the very low filling temperature during the filling of the hydrogen tanks 200 with the hydrogen.

Meanwhile, referring to FIG. 5, according to an exemplary embodiment of the present disclosure, the hydrogen filling system 10 may include the temperature measuring unit 700 that is provided in the buffer line 26 and that measures the temperature of the hydrogen in the buffer line 26 and the temperature display unit 800 that is provided in the fuel cell electric vehicle 20 and that displays the temperature of the hydrogen that is measured by the temperature measuring unit 700.

This results from the fact that the temperatures of the buffer line 26 and the hydrogen tanks 200 are identically raised during the filling of the hydrogen tanks 200 with the hydrogen. The aim is to interrupt the supply of the hydrogen before the hydrogen tanks 200 are overheated to a predetermined temperature or more (e.g., 85° C. or more), by indirectly detecting the temperatures of the hydrogen tanks 200 through the temperature of the buffer line 26.

In general, hydrogen is supplied at a very low temperature (e.g., −33° C. to −40° C.) in a hydrogen station. However, when the supply temperature of the hydrogen is raised depending on a situation of the hydrogen station (e.g., an abnormality in a cooler), the temperatures of the hydrogen tanks 200 are excessively raised, and therefore the durability and safety of the hydrogen tanks 200 are deteriorated.

However, the present disclosure may stop filling the hydrogen tanks 200 with the hydrogen before the temperatures of the hydrogen tanks 200 are excessively raised, by indirectly detecting the temperatures of the hydrogen tanks 200 through the temperature of the buffer line 26 and informing a user of the detected temperatures of the hydrogen tanks 200.

Various measurement means capable of being mounted in the buffer line 26 (e.g., in the end portion of the buffer line 26 that is connected to the receptacle 100) to measure the temperature in the buffer line 26 may be used as the temperature measuring unit 70, and the present disclosure is not restricted or limited by the type of the temperature measuring unit 700 and the measurement method thereof.

A bimetal temperature switch may preferably be used as the temperature measuring unit 700.

For example, the bimetal temperature switch may be formed by stacking two metal plates (not illustrated) that have different coefficients of thermal expansion. More specifically, when the inner temperature of the buffer line 26 rises, a metal plate having a higher degree of thermal expansion may further expand and bend toward a metal plate having a lower degree of thermal expansion. In contrast, when the inner temperature of the buffer line 26 falls, the metal plate having a higher degree of thermal expansion may further contract, and the bimetal temperature switch may bend in the direction toward the metal plate having a higher degree of thermal expansion.

Various display means capable of displaying the inner temperature of the buffer line 26 that is measured by the temperature measuring unit 700 may be used as the temperature display unit 800, and the present disclosure is not restricted or limited by the type and structure of the temperature display unit 800.

For example, the temperature display unit 800 may be configured to display a variation in the inner temperature of the buffer line 26 in an analog manner. According to another embodiment of the present disclosure, a temperature display unit may be configured to display a variation in the inner temperature of the buffer line 26 in a digital manner.

The temperature display unit 800 may be mounted on the inside or inner surface of a hydrogen intake cover (not illustrated), and the mounting position of the temperature display unit 800 may be variously modified depending on a required condition and a design specification.

In the related art, whether the hydrogen tanks 200 are overheated or not is determined by mounting temperature sensors in the fuel cell electric vehicle 20 (e.g., the hydrogen tanks 200) and remotely transmitting, to a hydrogen station, signals (the temperatures of the hydrogen tanks 200) that are measured by the temperature sensors during filling of the hydrogen tanks 200 with hydrogen. However, when the temperatures of the hydrogen tanks 200 are not accurately transmitted to the hydrogen station due to an abnormality in communication between the temperature sensors and the hydrogen station, it is difficult to determine at the right time whether the hydrogen tanks 200 are overheated.

However, the present disclosure may allow the user to directly determine whether the hydrogen tanks 200 are overheated or not, through the temperature display unit 800 at the right time. Accordingly, even in the case of an abnormality in communication between the temperature sensors and the hydrogen station, the present disclosure may determine at the right time whether the hydrogen tanks 200 are overheated or not and may stop filling the hydrogen tanks 200 with the hydrogen before the hydrogen tanks 200 are overheated, thereby obtaining an advantageous effect of minimizing deterioration in the durability and safety of the hydrogen tanks 200 due to overheating.

Furthermore, referring to FIG. 6, according to an exemplary embodiment of the present disclosure, the hydrogen filling system 10 includes the temperature measuring unit 700 that is provided in the buffer line 26 and that measures the temperature of the hydrogen in the buffer line 26, the control valve 900 that adjusts the amount of the hydrogen that is supplied along the hydrogen filling line 22, and the control unit 920 that controls the control valve 900, based on the inner temperature of the buffer line 26 that is measured by the temperature measuring unit 700.

This results from the fact that the temperatures of the buffer line 26 and the hydrogen tanks 200 are identically raised during the filling of the hydrogen tanks 200 with the hydrogen. The aim is to indirectly detect the temperatures of the hydrogen tanks 200 through the temperature of the buffer line 26 and stop filling the hydrogen tanks 200 with the hydrogen, or control the amount of the hydrogen with which the hydrogen tanks 200 are filled, depending on a temperature variation (or overheating) of the hydrogen tanks 200.

Various measurement means capable of being mounted in the buffer line 26 (e.g., in the end portion of the buffer line 26 that is connected to the receptacle 100) to measure the temperature in the buffer line 26 may be used as the temperature measuring unit 700, and the present disclosure is not restricted or limited by the type of the temperature measuring unit 700 and the measurement method thereof.

A bimetal temperature switch may preferably be used as the temperature measuring unit 700.

For example, the bimetal temperature switch may be formed by stacking two metal plates (not illustrated) that have different coefficients of thermal expansion. More specifically, when the inner temperature of the buffer line 26 rises, a metal plate having a higher degree of thermal expansion may further expand and bend toward a metal plate having a lower degree of thermal expansion. In contrast, when the inner temperature of the buffer line 26 falls, the metal plate having a higher degree of thermal expansion may further contract, and the bimetal temperature switch may bend in the direction toward the metal plate having a higher degree of thermal expansion.

The control valve 900 is configured to adjust the amount of the hydrogen that is supplied along the hydrogen filling line 22.

Here, adjusting the amount of the hydrogen that is supplied along the hydrogen filling line 22 is defined as including stopping or allowing for the supply of the hydrogen and adjusting the amount of the hydrogen that is supplied.

Various valve means capable of adjusting the amount of the hydrogen that is supplied along the hydrogen filling line 22 may be used as the control valve 900, and the present disclosure is not restricted or limited by the type and structure of the control valve 900.

For example, the control valve 900 may be connected to the hydrogen filling line 22 so as to be disposed between the manifold 300 and the receptacle 100. In another example, a control valve may be connected to the hydrogen filling line 22 so as to be disposed between the manifold 300 and the hydrogen tanks 200. According to another embodiment of the present disclosure, a control valve may be mounted at the inlets of the hydrogen tanks 200.

The control unit 920 controls the control valve 900, based on the inner temperature of the buffer line 26 that is measured by the temperature measuring unit 700.

For example, when the temperatures of the hydrogen tanks 200 are raised to a predetermined temperature or more, the control unit 920 may control the control valve 900 to stop filling the hydrogen tanks 200 with the hydrogen or lower the amount of the hydrogen with which the hydrogen tanks 200 are filled. The control unit 920 of the apparatus according to an exemplary embodiment of the present disclosure may be a processor (e.g., computer, microprocessor, CPU, ASIC, circuitry, logic circuits, etc.).

As described above, depending on a temperature variation (or overheating) of the hydrogen tanks 200, the present disclosure may stop filling the hydrogen tanks 200 with the hydrogen or may control the amount of the hydrogen with which the hydrogen tanks 200 are filled. Accordingly, before the hydrogen tanks 200 are overheated, the present disclosure may stop filling the hydrogen tanks 200 with the hydrogen (or may lower the amount of the hydrogen with which the hydrogen tanks 200 are filled), thereby obtaining an advantageous effect of minimizing deterioration in the durability and safety of the hydrogen tanks 200 due to overheating.

As described above, according to the present disclosure, the hydrogen filling system may obtain an advantageous effect of suppressing freezing of the receptacle connected with the fueling nozzle and improving safety and reliability.

In particular, according to the present disclosure, the hydrogen filling system may obtain an advantageous effect of suppressing freezing of the receptacle while the hydrogen tank is filled with the hydrogen and easily separating the fueling nozzle from the receptacle after the hydrogen tank is completely filled with the hydrogen.

Furthermore, according to the present disclosure, the hydrogen filling system may obtain an advantageous effect of minimizing deterioration in durability and safety due to freezing of the receptacle.

In addition, according to the present disclosure, the hydrogen filling system may obtain an advantageous effect of suppressing overheating of the hydrogen tank at the right time and minimizing deterioration in durability of the hydrogen tank and damage to the hydrogen tank.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A hydrogen filling system, comprising:
    a receptacle that is provided in a fuel cell electric vehicle and to which a fueling nozzle configured to dispense hydrogen is connected;
    a manifold connected with a hydrogen tank provided in the fuel cell electric vehicle;
    a hydrogen filling line configured to connect the receptacle and the manifold;
    a hydrogen supply line configured to connect a fuel cell stack provided in the fuel cell electric vehicle and the manifold; and
    a buffer line connected to the hydrogen supply line and configured to heat the receptacle using heat of compression by the hydrogen that is supplied into the hydrogen supply line during filling of the hydrogen tank with the hydrogen.

2. The hydrogen filling system of claim 1, further comprising:
    a regulator provided on the hydrogen supply line and configured to reduce pressure of the hydrogen that is supplied into the fuel cell stack,
    wherein one end of the buffer line is connected to the hydrogen supply line between the manifold and the regulator, and an opposite end of the buffer line is connected to the receptacle.

3. The hydrogen filling system of claim 2, wherein a sealed buffer chamber is provided around the receptacle, and
    wherein the opposite end of the buffer line is connected to the sealed buffer chamber.

4. The hydrogen filling system of claim 3, wherein the receptacle includes:
    a receptacle body having a supply fluid channel that is formed in the receptacle body and is in communication with the fueling nozzle;
    a valve member configured to selectively open or close the supply fluid channel; and
    a cover member configured to surround the receptacle body, wherein the sealed buffer chamber is formed in the cover member.

5. The hydrogen filling system of claim 4, wherein the sealed buffer chamber is formed to entirely surround an outer circumferential surface of the receptacle body.

6. The hydrogen filling system of claim 4, wherein the sealed buffer chamber is formed to helically surround an outer circumferential surface of the receptacle body.

7. The hydrogen filling system of claim 2, further comprising:
    a fuel processing system connected to the hydrogen supply line between the regulator and the fuel cell stack and configured to adjust the supply of the hydrogen into the fuel cell stack,
    wherein the heat of compression is generated in the hydrogen with an increase in pressure in the buffer line when the supply of the hydrogen into the fuel cell stack is interrupted by the fuel processing system during the filling of the hydrogen tank with the hydrogen.

8. The hydrogen filling system of claim 1, further comprising:
    a temperature measuring unit provided in the buffer line and configured to measure inner temperature of the buffer line; and
    a temperature display unit provided in the fuel cell electric vehicle and configured to display the inner temperature of the buffer line that is measured by the temperature measuring unit.

9. The hydrogen filling system of claim 8, wherein the temperature measuring unit includes a bimetal temperature switch.

10. The hydrogen filling system of claim 1, further comprising:
    a temperature measuring unit provided in the buffer line and configured to measure inner temperature of the buffer line;
    a control valve configured to control an amount of the hydrogen that is supplied along the hydrogen filling line; and
    a control unit configured to control the control valve, based on the inner temperature of the buffer line that is measured by the temperature measuring unit.

* * * * *